March 9, 1965

N. T. CRICHTON 3,172,378

FURNACE ROOF

Filed Feb. 20, 1964

INVENTOR.
NEIL T. CRICHTON
BY William C. Nealon
ATTORNEY

March 9, 1965   N. T. CRICHTON   3,172,378
FURNACE ROOF
Filed Feb. 20, 1964   2 Sheets-Sheet 2

INVENTOR.
NEIL T. CRICHTON
BY
ATTORNEY

United States Patent Office 3,172,378
Patented Mar. 9, 1965

3,172,378
FURNACE ROOF
Neil T. Crichton, Pittsburgh, Pa., assignor to Harbison-Walker Refractories Company, Pittsburgh, Pa., a corporation of Pennsylvania
Filed Feb. 20, 1964, Ser. No. 346,242
7 Claims. (Cl. 110—99)

This invention relates to an improved open hearth furnace roof construction. More particularly, it relates to an improved open hearth roof construction made of basic refractories of the group chrome ore, magnesite, chrome ore-magnesite, and magnesite-chrome ore, which are arranged in a series of contiguous courses to form a downwardly opening arched-type roof.

In the operation of industrial furnaces, such as used in the melting of metal to make steel, environmental conditions exist which subject a furnace roof to severe mechanical stresses as well as corrosive fumes and dusts which evolve during the process. The mechanical stresses, in large part, of course, are the direct result of cyclic temperature variation during the operation of the furnace, which cause expansion and contraction of the refractory brick which make up the roof.

It is a primary object of this invention to provide a means of prolonging the service life of a refractory furnace roof of the open hearth type, by providing a construction more able to resist and compensate for the stresses induced therein during operation of the furnace. It is another object of the invention to provide an improved open hearth furnace construction characterized by contiguous series of brick courses rigidly secured in the form of inverted approximate catenary curves, which structure is better able to resist destruction by furnace operation than prior constuctions.

Briefly, according to one embodiment of the invention, there is provided an improved open hearth furnace roof construction of the downwardly-opening arched type, which is constructed of a plurality of arched contiguous courses of basic refractory brick. Each of these courses extends between spaced skewbacks carried by a furnace front pier and rear furnace bank, respectively. The cross sectional configuration, of the roof constructed of the series of arched courses, is such that a center line through any of the arched courses at least approximates the shape of an inverted catenary arch. Hold-up and hold-down structure is provided for the roof. The hold-up and hold-down structure is arranged to substantially eliminate upward or downward movement of the roof.

This hold-up and hold-down structure, to a large degree, prevents brick and, thus, roof breakdown by absorbing or, in some manner, overcoming the tendency of the roof to rise and fall due to expansion and contraction of brick during cyclic variation in furnace operating temperatures. The thrust of such a catenary arch construction is more nearly in a vertical direction than in other types of arched roof construction, thereby reducing horizontal stresses on the furnace support structure. Of course, this provides greater roof stability, and decreases the mechanical stress per brick unit. A better understanding, other objects and advantages of roof construction according to the concepts of this invention will be readily apparent to those in the refractory and metallurgical arts, from a study of the following detailed description with reference to the appended exemplary drawings. In these drawings:

FIG. 5 is a perspective view of a preferred brick construction of the type used in the roof of FIGS. 1 and 2.

Preferred construction of open hearth roofs according to this invention is easily accomplished from portable platforms, thereby eliminating the need for wooden center forms. In large part, the wooden center forms are eliminated, because each brick is individually and directly connected to hold-up and hold-down structure.

Figure 1:
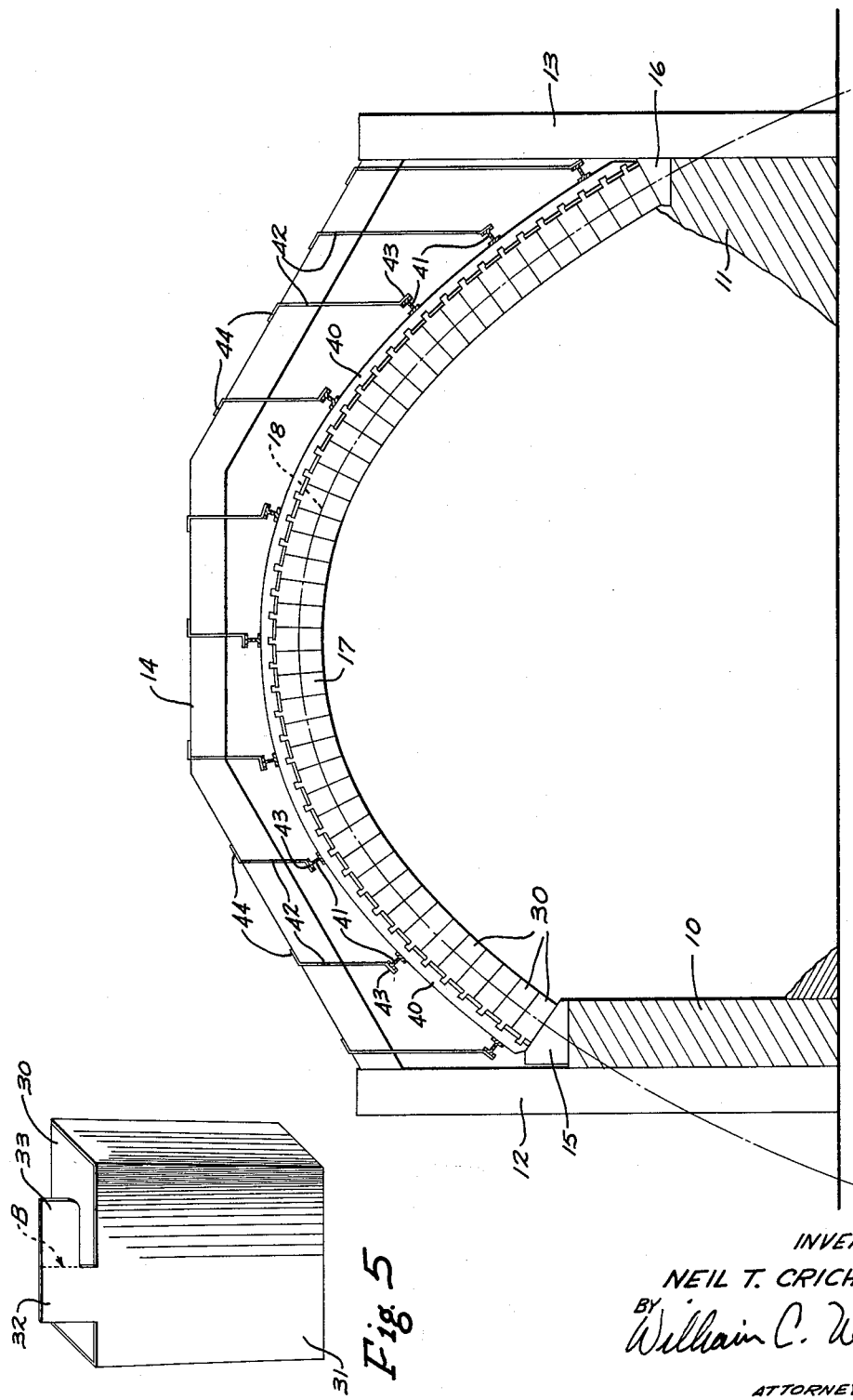
FIG. 1 is a schematic side elevation of open hearth roof construction according to this invention.

In FIG. 1, a portion of an open hearth furnace, from the sill level to the uppermost cross-binders, is illustrated as it would appear with an endwall removed. The front pier 10 and rear bank 11, of course, extend upwardly from the furnace bottom and terminate a distance below the top of the buckstays 12 and 13, which are contiguously positioned against the respective pier and rear bank in order to, in large part, overcome the tendency of these parts to buckle outwardly under service conditions. The buckstays 12 and 13, as well as the cross-binders 14, which are interconnected between the upper extremity of the buckstays, are of heavy steel. The piers 11 and 12 are refractory and can be of brick in combination with interior refractory monolith, or cast entirely in situ of refractory monolith in known manners. In practice, the front pier 10 rises an appreciable, as distinguished from negligible, distance above the rear bank in order to accommodate charging doors (not shown).

Mounted on the top of the pier and rear bank are the spaced pair of skewbacks, respective ends terminating on the biassed upper surface of said skewbacks. The sloped surface of the skewbacks is at such an angle that the center line 18 of the roof intersects it at approximately right angles. The center line of the roof approximates an inverted catenary curve. A plurality of metal encased basic refractory brick 30 is arranged soldier style to form the roof.

Figure 2:
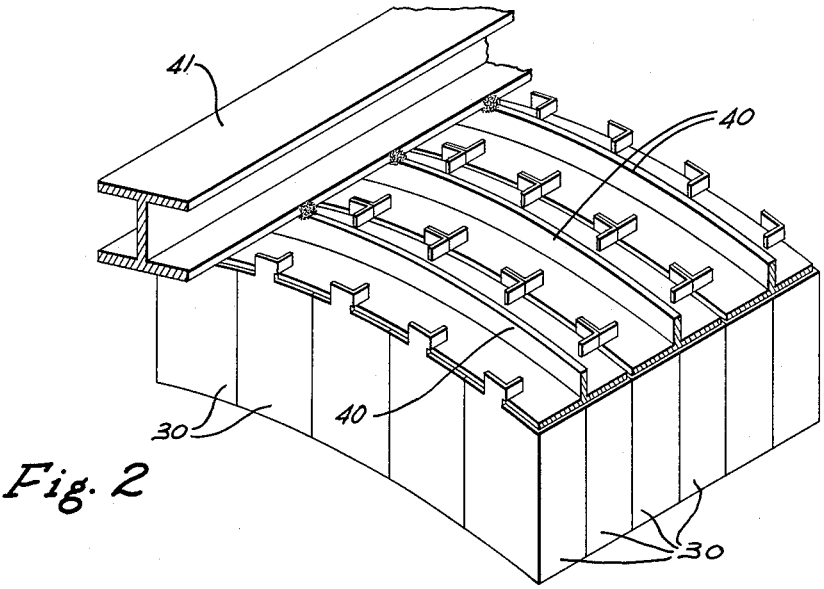
FIG. 2 is a fragmentary perspective view showing a series of contiguous courses of brick as used in the construction of a roof of the type shown in FIG. 1.

I prefer that the brick be of the type disclosed in my copending application Serial No. 335,555, entitled "Refractory Roof," filed January 3, 1964, and owned by the same assignee as the present invention. FIG. 5 is illustrative of such a shape. It includes a basic refractory block 30, usually chemically bonded, but it can be ceramically bonded, encompassed within the sheet metal casing or sheath 31 which extends completely about its four long sides and further including an upwardly extending, generally inverted L-shaped tab 32, the arm portion 33 of which is arranged to be bent about a bend line B, so it can be suspended about one leg of the curved beam 40 which, in cross section, is of generally inverted T shape. The beam 40 extends from one skewback to the other, and is bent to a shape substantially equivalent to the curve of the roof 17. It is thereby arranged to contiguously seat on the upper or cold ends of the series of brick 30. When the brick are suspended by bending the arm 33 of the tab 32 over an adjacent leg of the beam, they are held-up. A series of I-beams 41 extend traversely of the series of beams 40 to obtain rigidness the entire length of the roof. The bars 42 have respective opposed ends 43 and 44 welded to the I-beams 41 and cross-binders 14 to obtain still further rigidity and obtain the desired hold-down action in the support structure. The roof may be made up in a conventional rib and valley manner, but I prefer that all brick be of the type shown in FIG. 5, thereby requiring one beam 40 or equivalent for each adjacent pair of courses. (See FIG. 2.)

Figure 3:
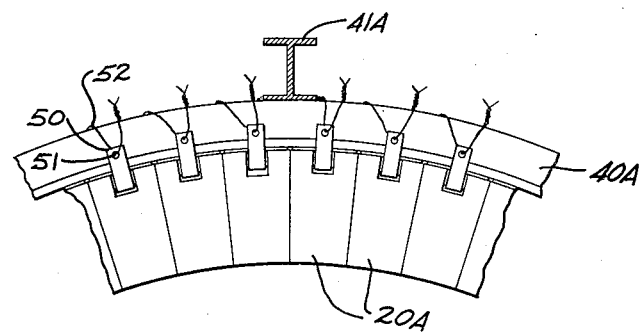
FIG. 3 is a fragmentary side elevation of an alternative hold-up and hold-down arrangement for construction of roofs according to this invention.

In the alternative construction of FIG. 3, a different hold-up and hold-down system is shown. Inverted T-shaped beams 40A or equivalent are still used, together with the longitudinally extending I-beams 41A. This combination of beams 40A and 41A serves to hold down the roof as they did with the arrangement of FIGS. 1 and 2. However, the brick 20A are of the type shown in United States Patent No. 3,029,755 or copending application Serial No. 265,990 (Duncan et al., entitled "Refractory Brick Units," filed March 18, 1963, and owned by the same assignee as the present invention, now United States Patent No. 3,140,676). Such brick are again metal encased basic refractory brick. They each have some manner of upwardly extending tab 50 which is apertured as at 51. These brick are suspended by wiring them. For example, a length of wire 52 is passed about the beam 40A and through the aperture 51, to thereby suspend or hold up the brick.

Figure 4:
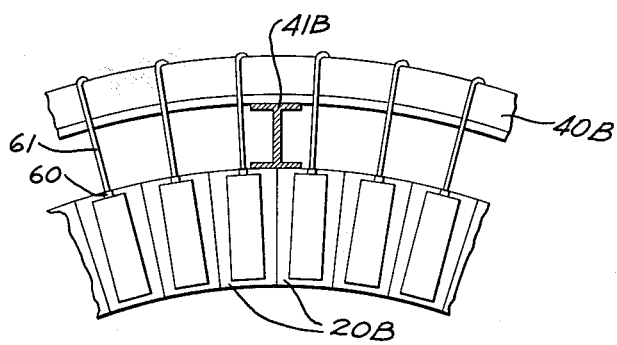
FIG. 4 is a fragmentary illustration of still another hold-up and hold-down arrangement, usable according to the concepts of this invention.

FIG. 4 shows still another type of metal enclosed basic refractory brick which can be used in practicing the present invention. In FIG. 4, curved inverted beams 40B again extend between the opposed skewbacks and at a curve that is approximately the same as curve of the roof. However, the beam 40B is spaced from the roof by a series of beams 41B similar to the beams 41 of FIGS. 1 and 2. In effect, I am here reversing the position of the interconnected intersecting network of beams. The metal encased brick 20B can be, for example, of the type disclosed and claimed in United States Patent No. 3,068,813, to J. P. Walt, and entitled "Furnace Block With Hanger Socket." These brick 20B have their sockets 60 interconnected with a rod 61, which is tautly bent about the beam 40B to hold the brick up.

Applicant is aware of the United States patent to Norton, No. 1,686,761, which, in general, discloses the concept of a free-floating catenary arch-type roof.

Having thus described the invention in detail and with sufficient particularity as to enable those skilled in the art to practice it, what is desired to have protected by Letters Patent is set forth in the following claims.

I claim:

1. An improved open hearth furnace roof construction of the downwardly opening arched type, which is constructed of a plurality of arched contiguous courses of refractory brick, said courses extending between spaced skewbacks carried by furnace front piers and rear banks, the cross sectional configuration of the roof being such that a center line through any arched course of brick at least approximately has the shape of an inverted catenary arch, hold-up and hold-down structure for the courses of brick arranged to substantially eliminate upward and downward movement of said roof during furnace operation, and front pier and rear bank buckstays contiguous to the exterior surfaces of the respective pier and bank to overcome their tendency to buckle when the furnace is in operation, cross-binders extending between the buckstays at a position spaced above the hold-up and hold-down structure, the hold-up and hold-down structure including two series of intersecting beams, a first series of beams extending lengthwise of the furnace roof and the other series extending at substantially right angles to the first series from the pier skewback to the bank skewback, said other series of beams being bent to form a curve substantially the same as that of the courses of brick and being positioned substantially contiguous the upper side of said courses whereby to hold down the courses and thus the roof, the beams of each series of beams being interconnected to each other, there being means by which the two series of beams are rigidly interconnected with the cross-binders, and the hold-up means being comprised of hanger means interconnected at one end to the brick and at the other end to a curved beam whereby to hold up said courses.

2. An improved open hearth furnace roof construction of the downwardly opening arched type, which is constructed of a plurality of arched contiguous courses of refractory brick, said courses extending between spaced skewbacks carried by furnace front piers and rear banks, the cross sectional configuration of the roof being such that a center line through any arched course of brick at least approximately has the shape of an inverted catenary arch, hold-up and hold-down structure for the courses of brick arranged to substantially eliminate upward and downward movement of said roof during furnace operation, and front pier and rear bank buckstays contiguous to the exterior surfaces of the respective pier and bank to overcome their tendency to buckle when the furnace is in operation, cross-binders extending between the buckstays at a position spaced above the hold-up and hold-down structure, the hold-up and hold-down structure including two parallel series of intersecting beams, a first series of beams extending lengthwise of the furnace roof and the other series extending at substantially right angles to the first series from the pier skewback to the bank skewback, said other series of beams being bent to form a curve substantially the same as that of the courses of brick and being positioned immediately adjacent the upper side of the courses whereby to hold down the courses and thus the roof, the beams of each series of beams being interconnected to each other in the form of a rigid network, there being means by which the two series of beams are rigidly interconnected with the cross-binders, and the hold-up means being comprised of hanger means interconnected at one end to the brick and at the other end to a curved beam whereby to hold up said courses.

3. The roof of claim 2 in which each pair of adjacent courses is suspended from a common beam of the series which extends between the spaced skewbacks.

4. The roof of claim 3 in which each brick of each course is separately suspended, and in which each brick contiguously abuts prior and successive brick in a common course and also contiguously abuts brick in adjacent parallel courses.

5. The roof of claim 2 in which the brick are metal encased basic refractory brick.

6. An improved basic open hearth furnace roof construction of the downwardly opening arched type, which is constructed of a plurality of parallel, arched, contiguous courses of basic refractory brick selected from the group chrome ore, magnesite, magnesite-chrome ore and chrome ore-magnesite, said courses extending between spaced skewbacks carried by furnace front piers and rear banks, the cross sectional configuration of the roof being such that a center line through any arched course of brick at least approximately has the shape of an inverted catenary arch, hold-up and hold-down structure for the courses of brick arranged to substantially eliminate upward and downward movement of said roof during furnace operation, and front pier and rear bank buckstays contiguous the exterior surfaces of the respective pier and bank to overcome their tendency to buckle when the furnace is in operation, cross-binders extending between the buckstays at a position spaced above the hold-up and hold-down structure, the cross-binders having a downwardly opening arched shape complementary to the curvature of the roof, the hold-up and hold-down structure including two series of intersecting beams, a first series of beams extending lengthwise of the furnace roof and a second series extending at substantially right angles to the first series from the pier skewback to the bank skewback, said second series of beams being bent to form a curve substantially the same as that of the course of brick and being positioned immediately adjacent the upper side of the courses whereby to hold down the courses and thus the roof, the beams of each series of beams being interconnected to each other in the form of a rigid network, there being means by which the two series of beams are rigidly interconnected with the cross-binders, and the hold-up means being comprised of hanger means interconnected at one end to the brick and at the other end to a curved beam whereby to hold up said courses.

7. The roof of claim 6 in which alternate groups of courses are valley courses.

References Cited by the Examiner

UNITED STATES PATENTS

| | | | |
|---|---|---|---|
| 1,686,761 | 10/28 | Norton | 110—99 |
| 2,091,224 | 8/37 | Brinckerhoff et al. | 110—99 X |
| 3,015,288 | 1/62 | Hosbein et al. | 110—99 |
| 3,144,842 | 8/64 | Murray | 110—99 |

FOREIGN PATENTS 1,248,126  10/60  France.

JAMES W. WESTHAVER, *Primary Examiner.*

ROBERT A. DUA, *Examiner.*